Oct. 6, 1931.   H. D. MORTON   1,826,186
METALLIC ELECTRODE ARC WELDING
Filed Dec. 2, 1918   6 Sheets-Sheet 1

INVENTOR
Harry D. Morton
BY
Gifford & Bull
his ATTORNEYS

Oct. 6, 1931.  H. D. MORTON  1,826,186
METALLIC ELECTRODE ARC WELDING
Filed Dec. 2, 1918   6 Sheets-Sheet 5

Fig. 5.

WITNESS

INVENTOR.
Harry D. Morton
BY
Gifford & Bull
his ATTORNEYS

Oct. 6, 1931.  H. D. MORTON  1,826,186
METALLIC ELECTRODE ARC WELDING
Filed Dec. 2, 1918  6 Sheets-Sheet 6

INVENTOR
Harry D. Morton
BY
Gifford & Bull
ATTORNEYS

Patented Oct. 6, 1931

1,826,186

UNITED STATES PATENT OFFICE

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN

METALLIC ELECTRODE ARC WELDING

Application filed December 2, 1918. Serial No. 264,927.

The invention relates to metallic electrode arc welding and particularly to an organization of apparatus including a welding tool or machine and a method of welding, though also applicable to arc welding generally in its broader aspects.

In metallic electrode arc welding as most commonly heretofore practiced, an electrode is grasped at one end in a suitable holder, by which current is conducted to it, and the other end is brought into contact with the work and slightly separated to strike the arc. The electrode melts and the workman advances it toward the work as it melts and moves it along the work to properly distribute the melted metal and form the weld. The best workman is usually able to maintain the arc only a short time and the quality of the work is uncertain and irregular.

It has been proposed to make machines entirely automatic and I have devised and successfully used such machines which are now in practical operation. In these machines the operations of feeding the melting electrode, maintaining the arc to prevent its repeated extinction and feeding the work and arc relative to one another, are done automatically, as set forth in my Patent No. 1,278,985, which was issued September 17, 1918. I have devised such machines designed both in forms which require the work to be brought to the machine and in which the machine is brought to the work.

In certain kinds of work, such, for example, as ship building, the hand welding operation is often the most convenient, but the welding is so variable in quality as to be impracticable with any but welders of the highest skill.

My invention includes a method of welding for such purposes wherein the feeding of the wire and the regulation and stabilizing of the arc are done automatically, but the movement of the electrode and work with reference to each other and hence the distribution of metal, and the control of the weld to that extent, is done manually. It also includes a machine or tool for this purpose and various other features hereinafter described and claimed.

Figure 1:
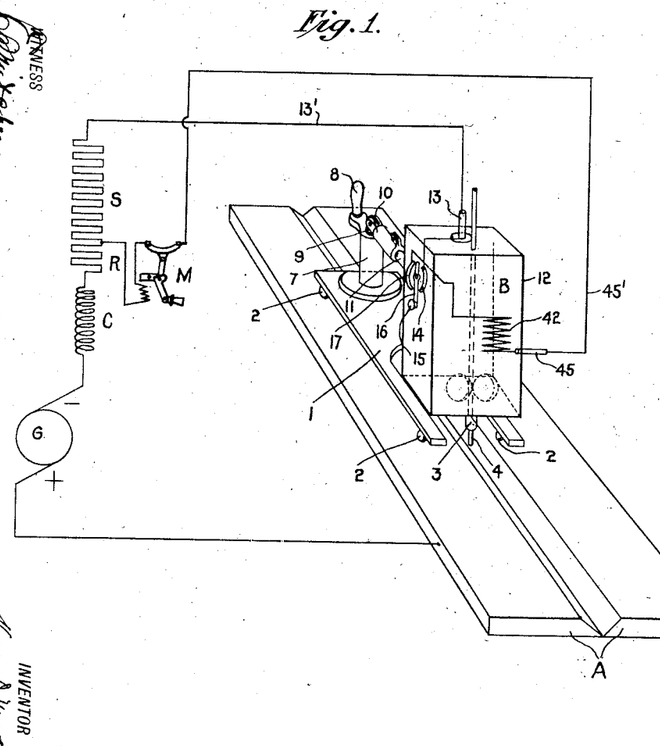
Fig. 1 is a diagrammatic illustration of a welding organization or system in accordance with my invention.

In Fig. 1, I have shown at A two plates to be welded, the abutting edges being bevelled as shown. B is an automatic welding machine having a carriage 1 and rollers 2, by which the electrode holder 3 of the machine is kept at an approximately uniform short distance from the work during the welding operation. A manipulating handle for the machine is shown at 8. The machine is provided with any suitable feeding and regulating mechanism, contained in a casing 12, for striking the arc between electrode 4 and work A and automatically feeding the electrode and regulating and maintaining the arc. Terminals 13 and 45 convey current from the machine to the negative pole of a direct current generator G, the positive pole of which is connected to the work A.

In order that any arc, connected to a more or less constant potential source, should be stable, it is necessary to employ a stabilizing means. That herein shown in Fig. 1 comprises a reactance C and a resistance R. In starting the arc it is convenient and desirable to insert momentarily an additional resistance S, which will limit the initial rush of current, but be cut out during the welding operation. For reasons hereinafter explained, it is desirable that the resistance R should be of the temperature compensated or zero temperature coefficient type, or otherwise kept constant.

Figures 2, 9:
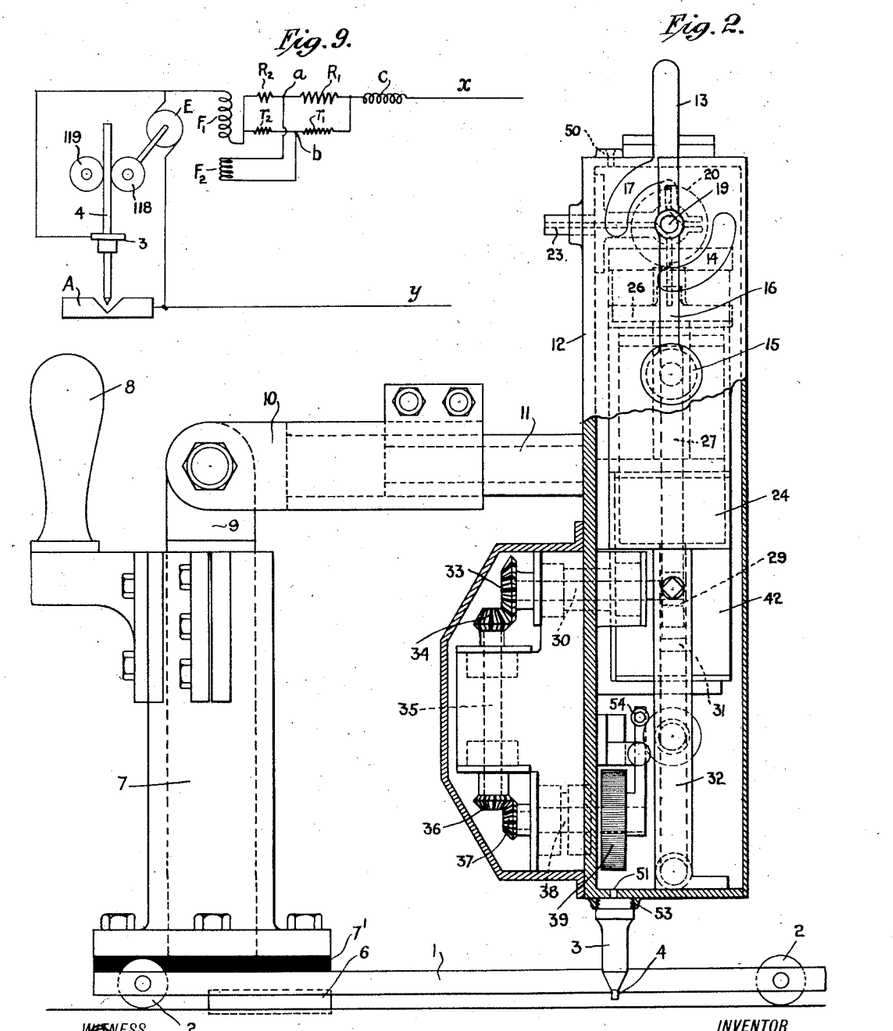
Fig. 2 shows, in elevation and partial cross section, one form of manually guided automatic welding machine or tool.
Fig. 9 is a modification of Fig. 1 indicating diagrammatically the tool of Figs. 5, 6 and 7.
Figure 3:
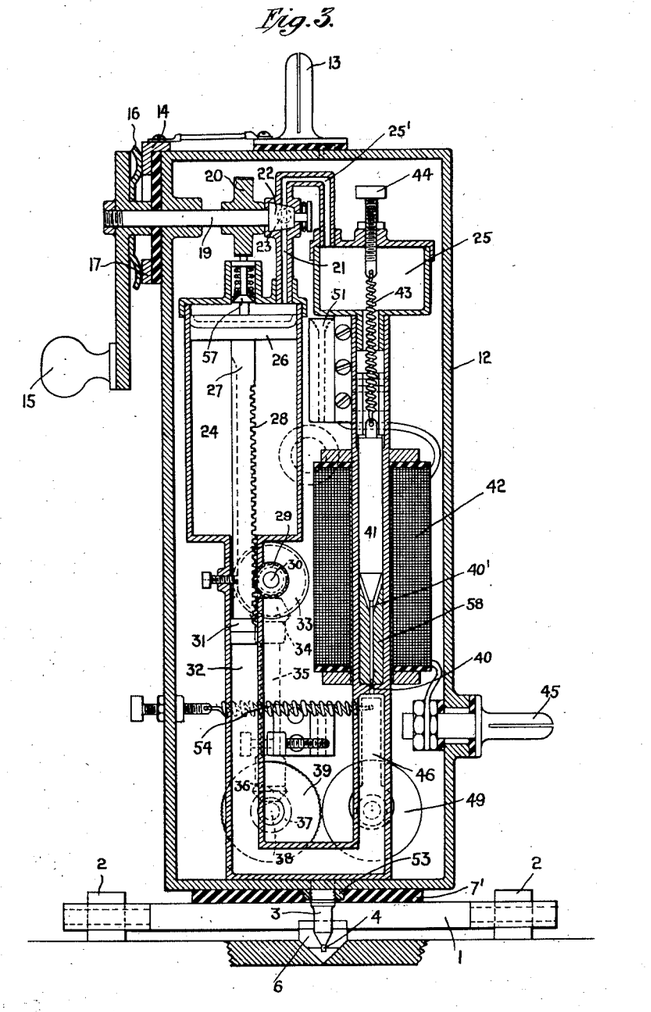
Fig. 3 and Fig. 4 are, respectively, end elevation and plan views, partially in cross section.
Figure 4:
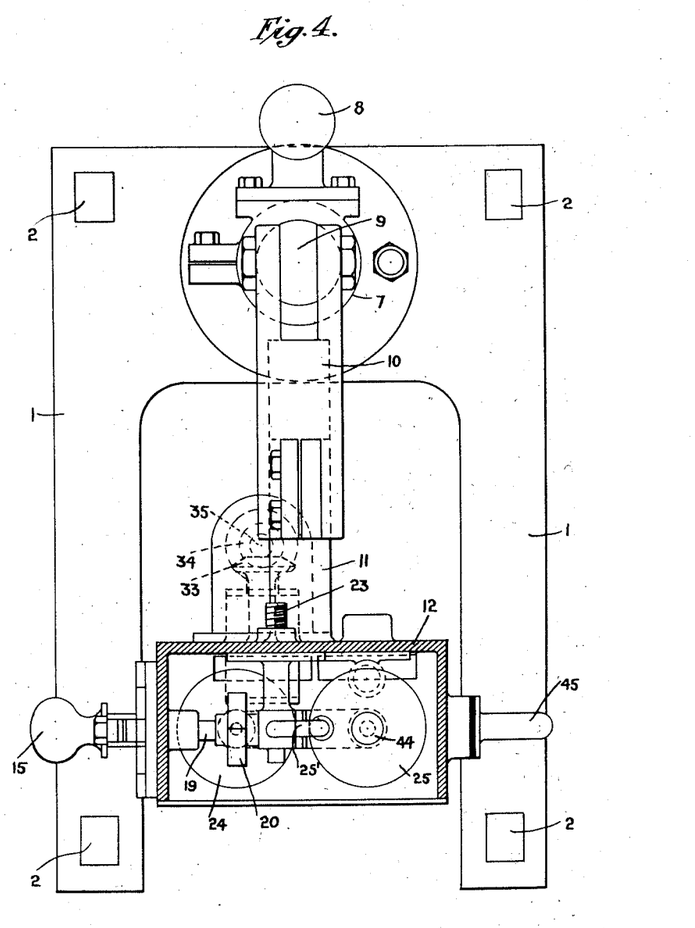

In Figs. 2, 3 and 4 I have illustrated one form of welding machine which may be employed in the organization of Fig. 1. The electrode controlling mechanism is mounted upon a base 1 which carries four wheels, 2. Upon the under side of this base is the guide 6, designed to follow the groove in which the welding material is to be deposited. Attached to the base 1, but electrically insulated therefrom by insulation 7', is a column 7, which is hollow and which carries the handle 8. Fitting in this hollow column 7 is a telescoping member 9, which is to be clamped in position and which affords adjustment vertically and in a horizontal plane for the welding head. Pivotally attached to the telescoping member 9 is a member 10 which provides for angular adjustment of the welding head in a vertical plane. The member 10 is hollow for a portion of its length, and clamped in this hollow portion is a cylindrical arm 11 of the welding head housing 12. This provides for movement of the welding head longitudinally with reference to the base 1 and pivotally about the axis of the cylindrical arm 11. The welding head is thus capable of adjustment to whatever position may be required for the particular work to be done. The carriage, with the welding head mounted thereon, may be drawn or pushed over the work at such a rate of speed as may be required for any particular cross-sectional area of welding, and while the machine here shown is particularly intended to be moved by an operator over the work, it may be attached by any well known means to a slowly moving endless rope, or similar device, in which case it would be fully automatic in action.

The electrode feeding and arc maintaining mechanism is contained in a housing 12, upon which is mounted a controlling switch having a handle 15. The welding strip 4 passes through guides 50 (indicating by dotted lines in the upper wall of casing 12) and 51, and electrode holder 3 mounted in boss 53, none of which need be insulated from the housing 12, and between the feed wheels 39 and 49, which are preferably grooved on their peripheries. The wheel 39 is preferably knurled to insure a more positive grip upon the electrode. The wheel 49 is eccentrically mounted on a pivoted arm 46 so that by movement of said arm it may be moved toward or away from wheel 39. It is normally drawn toward the latter by an adjustable spring 54.

The wheel 39 is driven by a compressed air device having a cylinder 24, provided with a piston 26, to which is attached the piston rod 27, a portion of which rod is provided with a rack 28. This rack actuates a pinion 29, mounted on a shaft 30. The downward movement of air piston 26 causes the rack 28 to rotate the pinion 29 and, through the shaft 30, bevel gear 33 and 34, shaft 35, bevel gears 36 and 37, and shaft 38, the wire feed driving roll 39.

At the lower end of air piston rod 27 is an oil plunger 31, moving in the oil tube 32. The downward movement of piston 26 is retarded by the dash-pot action of oil plunger 31 forcing oil through the needle valve 40. The size of the opening in this needle valve is controlled by a movable stem 40', which is attached to a movable armature 41. A magnet coil 42, through which the welding current passes, acts to draw the core 41 downward when current flows through it. Opposing the downward movement of this core is a spring 43, one end of which is connected to the core and the other end of which is connected to an adjusting screw 44. The core 58 of the magnet 42 is hollow, as shown, and the oil passes upward through core 58 and by an extension of tube 32, to reversing cylinder 25.

The cylinder 24 connects by an air passage 21 with a valve 22 located between it and an inlet pipe 23. This valve also acts to admit and exhaust air from reversing cylinder 25 through passage 25'. The movable part of valve 22 is carried upon a shaft 19 rotatable by a handle 15. This shaft 19 also carries the switch blade 16 and cam 20, and this acts to completely control the feeding mechanism.

The cylinder 24 is also provided with a valve 57 normally tending to close. A cam 20 on shaft 19 is arranged to depress and open valve 57. The valve 57 serves also as a stop limiting the upward movement of piston 26.

The switch comprises contacts 14 and 17 and blade 16. Contact 17 is connected to one terminal of coil 42, and contact 14 is connected to the terminal 13, both of which contacts, together with terminal 13 and 45, are insulated from the casing 12. The terminal 45 is connected to one terminal of coil 42.

The switch blade 16, cam 20 and movable part of valve 22 are so mounted upon shaft 19 that in one position of the handle 15 there is neither air nor electrical connection and cam 20 depresses valve 57 and prevents piston 26 from reaching the upper limit of its stroke. In another position there is still no electrical connection by the switch blade 16; the cam 20 still holds valve 57 open, but air is admitted to reservoir 25; there being no current in coil 42, the needle valve 40 is open and the air is permitted to force the oil out of reversing cylinder 25 through pipe 32, raising pistons 31 and 26 until the latter strikes the stop constituted by valve 57. Just beyond this second position the cam releases the valve 57 before any change has been made in the electrical or air connections and the piston 26 rises to the upper limit of its stroke, thereby raising the electrode to establish the arc. In a third position the cam 20 remains out of contact with the stem of valve 57; valve 22 vents reservoir 25 and supplies air to cylinder 24; while switch blade 16 connects contact 17 and permits current to flow through coil 42 to the terminal 45. This, it will be observed, has the effect of short circuiting starting resistance S.

To operate the machine it is first put in position on the work and connected as already described, the handle 15 being in the off position. The several adjusting means at 7, 9, 10 and 11 are then used to bring the housing into such a position that the electrode holder will be at the desired distance from the work, and the electrode in the correct alignment and at the correct angle to the work. The handle 15 is then moved to the second position so that air pressure is admitted to the rack-reversing cylinder 25, but there is no air pressure in cylinder 24. The welding wire is then placed in position in the guides and electrode holder 3 and its lower end brought into contact with the work.

At this time the upper end of air piston 26 is in contact with the lower end of stop 57, the upper end of which stop is on the high point of cam 20. Current is flowing from the positive pole of the generator, through the work A, the welding wire, the welding head housing 12, switch blade 16, switch member 14, terminal 13, cable 13', initial contact resistance S, and stabilizing means R, C, to the opposite pole of generator. The handle 15 is then turned in a clockwise direction, whereupon the upper end of stop 57 drops off the high point of cam 20, allowing the spring of said stop to raise it to the position shown in the drawing. The compressed air in rack-reversing cylinder 25, acting through the oil in tube 32, thereupon moves air piston 26 slightly upward. The rack 28, formed in piston rod 27, rotates pinion 29 in a reverse direction to the direction of rotation during the welding operation. This causes driving feed roll 39 to rotate in a counter-clockwise direction, drawing the welding wire slightly away from the work A and striking the arc.

The rotation of the handle 15 is continued and immediately the compressed air supply to rack-reversing cylinder 25 is cut off, the compressed air is diverted to air piston cylinder 24, causing driving feed roll 39 to feed the wire downward as it is fused during the operation of the welding. This movement of handle 15 will simultaneously have opened the port leading from the rack-reversing cylinder 25 to atmosphere, thus relieving the air pressure in said rack-reversing cylinder. At the same time the switch blade 16 connects contact 17 and thereby cuts out the initial contact resistance S and allows the welding current to flow to the arc as follows:

From the positive pole of the generator through the work, across the arc, through the welding wire, through electrode holder 3 and the welding head housing 12, to switch member 16, contact member 17, through the solenoid winding 42, terminal 45, conductor 45', through the welding resistance R and reactance C, to the opposite pole of the generator. An overload relay M is included in the conductor 45'. As the arc shortens the amperage rises, the winding 42 is more strongly energized, increasing the attraction of stationary armature 58 for movable armature 41, lowering the movable armature and constricting the opening in needle valve 40. This constriction reduces the flow of oil through said valve, decreasing the rate of downward movement of air piston 26 and consequently the rate of rotation of driving wire feed roll 39, thus causing the welding wire to feed more slowly than it is fused and the arc length is thus quickly restored to normal. Effective means are thus provided for controlling the relation between the fusing rate and the feeding rate of the strip.

In the event of the arc becoming too long, the drop in amperage and the consequent lessening of the pull of solenoid 42 will allow spring 43 to raise movable armature 41, enlarging the opening in needle valve 40, allowing more oil to flow therethrough, increasing the downward rate of movement of air piston 26, the rate of rotation of driving feed roll 39, and the consequent rate of feed of the welding wire. Thereupon, the wire is fed to the arc more rapidly than it is fused and the arc length is quickly restored to normal. By proper adjustment of the spring 43 and correct proportioning of the valve 40 to the viscosity of the oil employed, the above results are readily secured.

When the supply of welding wire placed in the guides has been fused, the handle 15 is turned to such a position that the compressed air is released from air piston cylinder 24, the welding circuit is broken and the supply of compressed air is diverted to cylinder 25. This pressure, acting through the oil in tube 32 upon oil plunger 31, restores air piston 26 to its position against the lower end of stop 57, the upper end of which stop is, as a result of such rotation of handle 16, at the high point of cam 20. Thereupon a new length of wire is inserted in the guides and placed in contact with the work. The arc is then struck and the welding operation proceeded with in the manner hereinbefore described.

The current is carried to the electrode chiefly by the electrode holder 3, as this furnishes the path of lowest resistance. I have found that it is very desirable for the maintenance of a stable arc, and in commercial use practically indispensable for the best results, that the electrode holder of an arc welding machine having automatic electrode feeding and arc maintaining means, should be as close as possible to the arc. The reason for this is not entirely clear, but I have found from much experience that if the electrode holder is a considerable distance from the arc, the arc becomes unstable and difficult to control. For example, in a particular automatic machine, developed and built by me, I have found that with a current of 140 amperes an electrode of iron or steel wire $\frac{3}{32}$ inch in diameter, fed at a speed of about 16 inches a minute through a holder, such as 3, reaching to within $\frac{1}{2}$ to $\frac{5}{8}$ inch of the arc, the operation is stable as long as the machine is kept in operation. If, however, this distance is materially increased in said machine, the length of time that the arc continues stable decreases, and if the distance is as great as 2 or 2½ inches, the arc is stable only for a few seconds after the machine is started.

A wire or rod $\frac{3}{32}$ of an inch in diameter would be melted in a short time by a current of about 90 amperes, and one of $\frac{1}{8}$ diameter by a current of about 140 amperes, and in general the current employed in welding is large enough to soon melt or raise to high incandescence, the electrode used if the latter were stationary. Inasmuch as the wire is fed continuously forward, it does not melt except at the arc, even with continuous welding, but the region of incandescence of the electrode gradually extends backward from the arc. While this may be due to mechanical vibration which is prevented by supporting the electrode close to the work, I have observed that the condition of instability accompanies this extension backward from the arc of the incandescence of the electrode, and that the correct distance is to be determined in view of the diameter of the wire, the current carried, and the speed at which the wire is fed. This leads me to believe that the sudden increase of resistance of the wire as it reaches the temperature of recalescence, and the extension backward of such a temperature to too great a distance, is the cause of this instability. However this may be, the fact is unquestionably established by my experience, and I have discovered that the difficulty can be overcome by conveying the current to the electrode by a support located at a point close to the arc. When this is done by an electrode guide or holder such as 3, it is advantageous to have this of sufficient current carrying capacity to avoid its being greatly heated by the current which it carries, and of good heat conducting material. Thus the heating to incandescence, with its attendant extreme changes in resistance, is confined to a short length of the electrode. The changes of resistance are therefore a small percentage of the total resistance, and do not result in instability. It will be seen, therefore, that the continuous feed and the point at which the current is taken to the electrode are features intimately related to the stability of the arc.

Another important feature is the adjusting means 7, 9, 10, 11 whereby the electrode and its holder are brought into correct position and angular relation to the work. The location and direction of the electrode with reference to the work is of great importance. In most cases, it seems to be desirable that the welding strip should not stand perpendicular to the weld. Particularly is this the case when the materials to be welded are thin. An angular difference of 5° will sometimes determine the difference between failure and success in a weld. About 15° from the perpendicular works well in many cases. In welding some materials it seems essential that the electrode should drag—i. e., point toward the already welded portion—rather than toward the unwelded portion of the seam. I have found this to be true with certain samples of manganese steel. Whether the electrode should drag or lead in angle must be ascertained by trial. It is also important that the welding strip should be symmetrically situated with respect to the abutting edges to be welded (or the two surfaces to be joined if the parts are lapped) and make equal angles with the two. The above described adjusting means permit of universal movement and thus make possible any desired adjustment of angle and of distance of the electrode holder 3 from the work.

Figure 5:
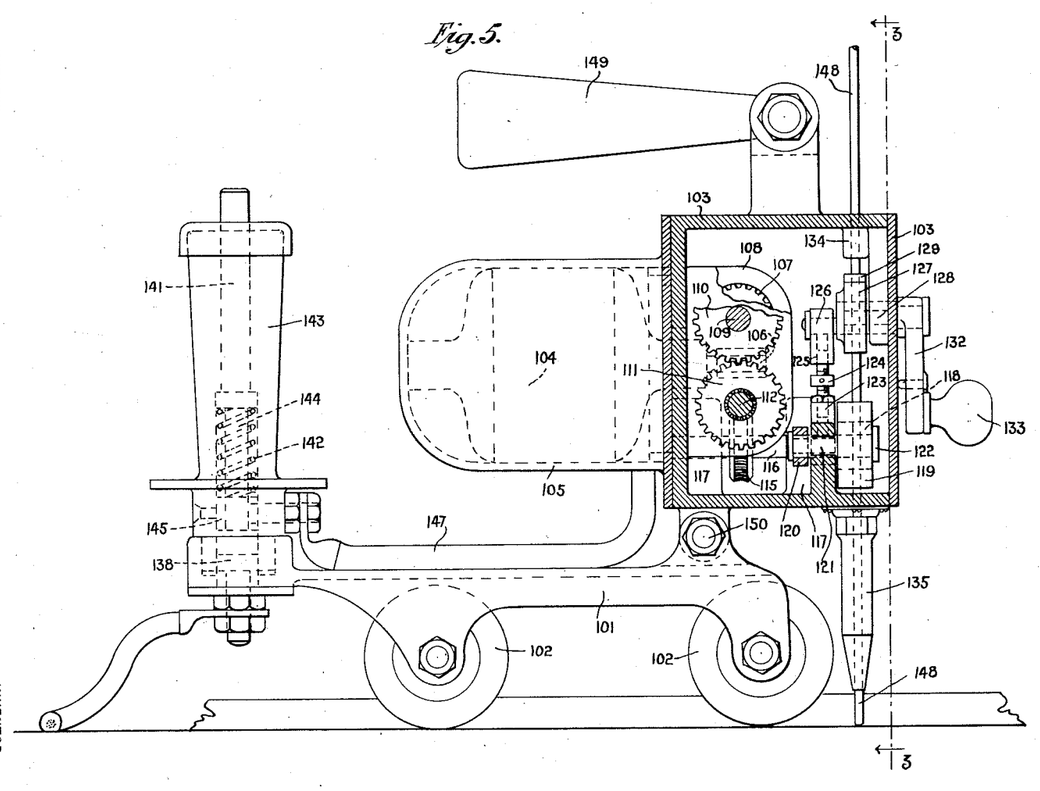
Figs. 5, 6 and 7 show another form of welding tool mechanism, being, respectively, side elevation, end elevation and plan view.
Figure 6:
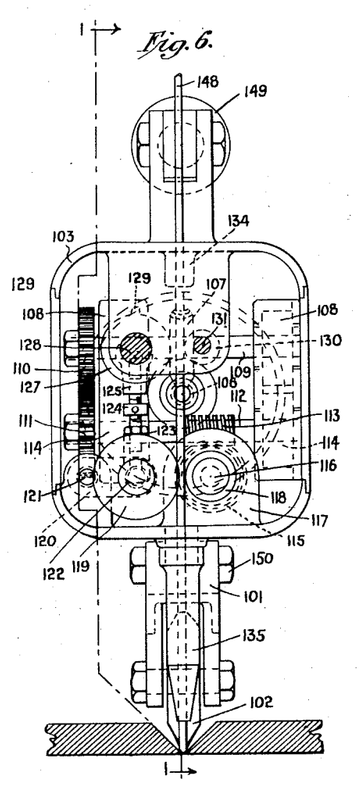
Figure 7:
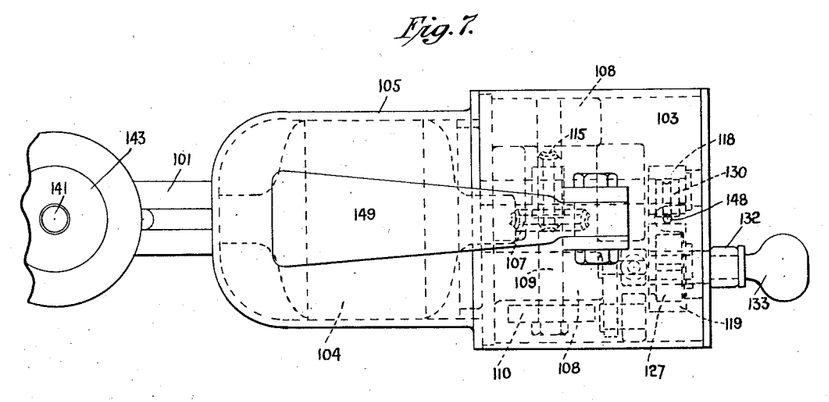

In Figures 5 to 7 I have shown a welding machine of different construction. Carriage 101 is supported by the two wheels 102—102. Mounted upon this carriage, by the insulating pivot 150, is the welding head housing 103. Attached to this housing is the motor housing 105, containing motor 104. Mounted on the shaft of motor 104 is the worm 106, which drives the worm gear 107, mounted on the shaft 109, having two bearings, 108. Attached to one end of shaft 109 is spur gear 110, meshing with spur gear 111, mounted on shaft 112, which shaft has two bearings, 114. These gears are so arranged that they may be readily removed and gears of different ratio substituted for them. Shaft 112 carries worm 113, which drives worm gear 115, mounted on shaft 116, having two bearings 117. On the outer end of this shaft 116 is mounted driving wire feed roll 118.

Coacting with this driving wire feed roll 118, to feed the wire during the welding operation, is idler wire feed roll 119, mounted on shaft 122. This latter shaft is mounted in lever 120, which, in turn, is pivotally mounted on shaft 121. Pivotally attached to the inner end of shaft 122 is lower link 123 of idler feed roll actuating rod. Screwed into this lower link is right-and-left-hand adjusting screw 124. The upper end of this adjusting screw 124 is screwed into the upper link 125 of idler feed roll actuating rod. The upper end of this upper link 125 is pivotally mounted upon the pin 126, which is attached to, and eccentric with reference to, the axis of rotation of cam member 127. This cam member is mounted upon the shaft 128 and to the outer end of this shaft is attached the arm 132, carrying the handle 133.

Integral with the cam member 127 is the cam 129, which cam, where it comes opposite the roll 130, coacts with said roll 130 to raise the wire in drawing the arc. The wire 148 passes through the guide 134, between the cam member 127, the arc drawing idler feed roll 130, the driving wire feed roll 118, and the idler wire feed roll 119, through the electrode holder 135, and to the arc.

While I have thought it desirable to show this tool as provided with arc starting means, it will be understood that ordinarily it will be of such light weight that the arc can be started by merely tilting the tool forward until the wire touches the work, and then backward to separate the electrodes. In such cases the arc starting means just described may be omitted.

The tool may be provided with conveniently located handles whereby it may be applied to and guided upon the work to produce the weld. In the drawings, two handles, 143 and 149, are shown, the latter being approximately over the center of gravity for easy carrying, but adjustably mounted so that it may be set as most convenient for any particular work. With the handle 143 is incorporated the switch by which the welding current through the tool is controlled. The particular details of this switch form no part of this invention. It is shown as comprising two contact members, 138 and 145, insulated from the carriage and from each other. Contact 138 is arranged for connection to the cable supplying the welding current, while contact 145 is connected to the motor by wire 147. A movable switch rod 144 is spring mounted in the handle 143, the spring 142 normally acting to hold the rod in its upper or inactive position. A rod 141 extends upwardly through the handle and serves as a push button to close the circuit between contacts 138 and 145.

Figure 8:
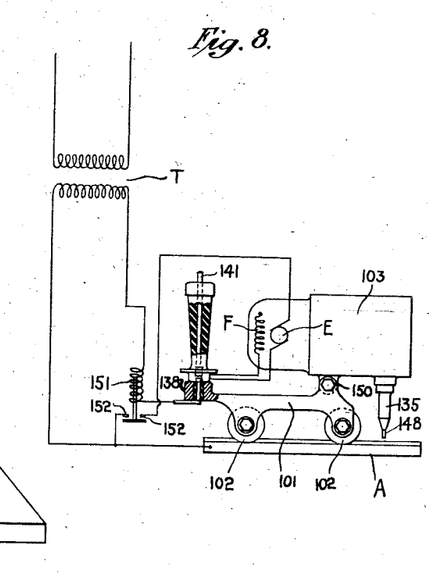
Fig. 8 is a diagram of another circuit arrangement.

In Figure 8 I have shown diagrammatically the connections of the motor. In this instance the source of current is indicated as an alternating current transformer of high internal reactance and requiring no auxiliary stabilizing means. This feature, however, forms no part of my present invention and it will be understood that the tool may be used in the circuit of Fig. 1. Of course the electrical construction of the motor will be properly adapted to the current employed, as well understood in the art.

One terminal of the secondary of the transformer T is connected to the work A and the other to contact 138 (Fig. 5) of the motor switch. The field magnet winding F has one terminal connected to contact 138 and the other to the housing 103, and thence via electrode holder 135 to the electrode 148. The armature E has one terminal connected to contact 138 and the other to the opposite pole of the source, either by connection to the carriage 101 or preferably by a special conductor to the work, as the latter arrangement insures against open circuits which may occur if the wheels 102 are relied upon to complete the circuit.

It will thus be seen that the field winding of the motor carries the entire welding current and the armature carries a current which is in shunt to the arc, the voltage applied to the armature being substantially the voltage of the arc. Of course a magnetic field responsive to variations in arc current could be obtained in other ways than by passing the entire current through the field magnet and I do not limit myself to this particular arrangement.

The operation of welding is as follows: The tool is placed in position and the electrical connection made. The handle 133 is rotated 180° in a counter-clockwise direction, which causes the eccentric pin 126 to raise idler feed roll 119 upward to a position where the wire when inserted in the guides will not contact with the idler feed roll. The wire is then inserted and brought into contact with the work, starting the flow of current. Thereupon the handle 133 is rotated 180° further to the position shown in the drawing. After having moved 90° of this 180°, the cam 129 will be forced against the wire 148, gripping the said wire between the serrated surface of the cam and the arc drawing idler feed roll 130, carrying the wire upward and drawing the arc. Immediately the arc is drawn, the motor 104 begins to rotate. The last 90° of movement of handle 133 restores idler wire feed roll 119 to the position shown in the drawing—i. e., to a position where it coacts with driving wire feed roll 118 to feed the wire downward. The rotation of the motor actuates worm 106, worm gear 107, shaft 109, gear 110, gear 111, shaft 112, worm 113, worm wheel 115, shaft 116, and driving wire feed roll 118. This driving wire feed roll 118 rotates in a counter-clockwise direction and, coacting with the idler feed roll 119, feeds the wire downward to the arc.

By adjusting the screw 124 of the idler feed roll actuating rod, idler feed roll 119 may be raised any desired distance to accommodate various sizes of wire; and this idler feed roll 119 can also be forced downward as far as may be desired, causing it to increase or diminish the gripping effect upon the wire and thereby vary to any desired extent the load upon the motor 104. The arc-drawing idler feed roll is mounted on a shaft 131, which is supported eccentrically with reference to the axis of rotation of said arc-drawing idler feed roll, to permit of adjustment for various sizes of wire.

The tandem wheels 102 engage and rotate in the groove to be welded and the entire mechanism is pulled or pushed along the seam at such a rate as will cause the arc to deposit the desired quantity of molten metal. The handles 143 and 149 afford means for conveniently manipulating the tool. By slightly tilting the tool on either side of its vertical axis, metal can be deposited on either side of the seam which is being welded, in case of variation in the cross-sectional area of the seam at any particular point. The welding head housing 103 is pivotally attached to the carriage 101 by the mounting 150, which permits of the proper angular adjustment of the electrode with reference to the seam to produce the best welding results.

The control feature is operative as follows: When the arc shortens the amperage increases and this increased amperage passing through the field coils of motor 104 strengthens the field of said motor, causing it to run more slowly. Additionally, the increase in amperage results in a drop in the voltage of the current passing through the armature of said motor, accentuating this speed-reducing action. Thereupon, the wire feeds more slowly than it is fused, and the arc resumes its normal length. Conversely, if the arc becomes too long, the reduced amperage will weaken the field of motor 104, increasing the speed of the motor. Simultaneously, the voltage of the armature circuit of the motor will increase, accentuating the speed-increasing effect. This increase in speed will cause the wire to feed more rapidly than it is fused, and the arc will be restored to its normal length. By the described means here shown, the relation between the fusing rate and the feeding rate of the strip is controlled. When the weld is completed, or the supply of wire in the tool is exhausted, the operator removes his thumb from movable switch member 141, the spring 142 raises the member and breaks the circuit, if it has not already been broken at the arc. Further, the feeding of the wire may be stopped at any time by turning the handle 133 a distance of 180 degrees from the position shown in the drawings, thereby disengaging from contact with the wire the idler feed roll 119.

Since the motor has its armature connected in shunt to the arc, it is evident that if the arc should rupture the greater part of the total circuit voltage would be at once transferred to the armature. As this might injure the armature, I employ in series therewith the contacts of a relay whose actuating coil is in the field or welding circuit, as indicated in Figure 8, wherein 151 is a magnet carrying the welding current and 152 are contacts controlling the armature circuit to close it when the arc is started, and open it when the welding current falls below some chosen small percentage of its normal value, in order to prevent an initial rush of current through the armature when the welding operation is started with the electrodes in contact. The magnet should be of quick acting design.

On account of its light weight, the operator will be able to easily manipulate the tool in any desired position. Any convenient length of wire may be inserted in the machine. If it should be desired at any time to use the tool with welding wire or on work having characteristics differing from those of the wire or work for which it is set, proper adjustments may be made by changing the change-speed spur gears 110 and 111, or within restricted limits by adjusting the screw 124 to increase or decrease the load on the motor 104, and thereby vary the speed of said motor.

While I have illustrated and described mechanism in which the welding apparatus is moved with reference to the work, it is to be understood that under some conditions it might be desirable to move the work with reference to the welding apparatus, and that I mean to cover by the claims either mode of operation.

Whatever arc maintaining mechanism may be employed, the adjustment must be accurately made. For example, the spring 43 must be very accurately adjusted to the strength of the magnet 42, in the particular machine shown in Figs. 2, 3 and 4, and in the machine of Figs. 5 to 7 the gear ratio of the gears 110 and 111 must be correctly chosen, and the adjusting screw 124 must be correctly adjusted. I have found that if the stabilizing means, such as resistance R and reactance C, is one whose effect is considerably different when hot from that exerted when cold, a single adjustment will not suffice, and readjustment may have to be made from time to time, particularly if the tool is not continuously in use. It is therefore highly desirable that the resistance R should be one having a low temperature resistance coefficient. I have found the low temperature coefficient alloys now on the market satisfactory. Any means, however, for rendering the effect of the resistance substantially constant may be employed to permit a constant adjustment of the spring.

The use of a stabilizing means constant in effect, the supply of current to the electrode close to the arc, and the adjustment of the controlling spring are correlated means in maintaining the arc. By correctly arranging these parts the only important variable resistance is that of the arc itself, and proper adjustment may easily be made.

In referring to "a stabilizing means constant in effect" I intend to imply such substantial or approximate constancy of resistance as will permit of constancy of adjustment. It might in some cases, for example, be possible to do this without employing a so-called zero coefficient material by using ordinary resistance grids having a normal carrying capacity so much greater than the welding current that the temperature would not vary greatly, or artificial cooling might be resorted to, to attain the same end by maintaining a constant temperature.

In Figure 9 I have indicated diagrammatically a different mode of attaining a stabilizing means constant in its effect, the circuit being a modification of that shown in Fig. 1, but the tool being substantially that of Figs. 5 to 7. The welding strip 4 is fed by feed rolls 118, 119, constantly driven by the armature E of an electric motor. This motor has two field windings $F_1$ and $F_2$. The supply wires $x$ and $y$ are connected respectively to reactance $c$ and work A. Stabilizing resistances $R_1$, $R_2$, $r_1$ and $r_2$ are arranged Wheatstone bridge fashion, as shown. Resistances $R_1$ and $R_2$ carry the major portion of the current, and $R_1$ constitutes the major portion of the resistance in that side of the bridge. It may be of any cheap or convenient form, such as a cast grid, iron wire, or water rheostat. Resistance $R_2$ is of a material whose resistance temperature coefficient approximates zero, as are also resistances $r_1$ and $r_2$.

The armature E of the motor is connected in shunt across the arc, and the field winding $F'$ is in series with the arc. Field winding $F_2$ is connected between points $a$ and $b$ of the bridge circuit, the Wheatstone bridge being so arranged that at the normal operating temperature no current will flow through the winding $F_2$. The operation is as follows: So long as resistance $R_1$ is at normal temperature, and hence normal value, no current flows between points $a$ and $b$. Should the resistance of $R_1$ change, current will flow between points $a$ and $b$ through field winding $F_2$. This winding is so connected that any increase in $R_1$ will cause the current in $F_2$ to strengthen the motor field and decrease the rate of feed, while a decrease in $R_1$ will have an opposite effect. In this manner the stabilizing resistance may change in value, but be constant in its stabilizing effect, and changes in the adjustment of the tool are obviated.

All the means and others which will suggest themselves, I intend to include as stabilizing means constant in effect.

I have found that when a stabilizing resistance constant in its effect is employed, and the current is taken to the electrode close to the arc, the maintenance of the arc becomes so much easier that a simpler tool having only means for feeding the electrode, but no automatic means for maintaining the arc by varying the feed, may be employed in some cases. In such cases, for example, the magnet 42 and spring 43, and their associated structural and magnetic parts, may be omitted and a simple hand valve substituted for valve 40 in the structure of Figs. 2, 3 and 4, and manipulated by the operator. Also in the structures of Figs. 5, 6 and 7 a constant speed motor may sometimes be employed in such cases.

Proper choice of electrode material is desirable in all cases, but in the last mentioned case it becomes especially desirable. By proper choice of electrode, the simpler forms of tool just mentioned are capable of doing reliable work without requiring a prohibitive amount of skill on the part of the operator.

While I have shown tools feeding the welding strip uninterruptedly, I do not limit myself to uninterrupted motion, as any device which mechanically feeds the electrode forward, whether step by step or uninterruptedly, may be employed, so long as the feeding occurs at the proper average rate of delivery and the intermittent feed is sufficiently rapid to prevent arc extinction. I may, for example, provide the continuous feed referred to in my claims by feeding the electrode forward by a rapidly intermittent motion, and maintain the arc by automatically varying either the frequency of such feed movements or the increments fed forward at each movement.

By the term "a characteristic of the arc" as used in my claims, I intend to include such variable, utilizable properties as accompany the operation of an arc, and which are indicative of its normal or abnormal operation, such, for example, as its current, voltage, resistance, length, or energy absorption. In the particular apparatus shown in Figs. 2 to 4 I have chosen the current as the variable characteristic to be used, and in Figs. 5 to 9 I have utilized two such characteristics—namely, the current and voltage—but I do not limit myself to these exclusively.

What I claim and desire to secure by Letters Patent of the United States is:—

1. The process of electric arc welding which consists in striking an arc between the work and a strip of metal, constituting one electrode, stabilizing said arc by supplying current to a point on the strip near the arc through a stabilizing means constant in its effect, maintaining said arc by feeding said electrode automatically toward the work, guiding the progress of the electrode over the work by contact with a groove in the work and preventing the flow of current through such contact, in order to effect a weld.

2. A portable welding tool for metallic electrode arc welding, including means for continuously feeding a welding strip toward the work, means for adjusting the angle of the welding strip to the work, and means, unaffected by said adjusting means, adapted to enter the joint to be welded and guide the same along the work.

3. In a metallic electrode arc welding apparatus, a stabilizing resistance whose effect is independent of its temperature, a welding tool having means for automatically feeding a welding strip, means on said welding tool for entering the groove to be welded and guiding the movement of the electrode over the work, adjustable means for maintaining the arc, and means for conveying the current to the electrode at a point near the arc.

4. In a metallic electrode arc welding apparatus, a stabilizing resistance whose effect is independent of its temperature, a manually operable welding tool having means adapted to bear upon the work, means for automatically feeding the welding strip toward the work, adjustable means for maintaining the arc, means for conveying the current to the electrode at a point near the arc, and means for governing the angle of the electrode to, and the distance of, said last named means from the work.

5. In an electric arc welding machine, a welding strip and means for continuously feeding said strip, comprising an electric motor and means for rendering said motor responsive to conditions in the welding circuit, said means comprising a field winding responsive to changes in current of the welding circuit and an armature responsive to changes in voltage in the welding circuit.

6. In a portable arc welding tool, means adapted to bear upon the work, means for manually moving the tool with reference to the work, means for continuously feeding a welding strip toward the work, means for changing the rate of feed, and means for adjusting the angle at which the welding strip is fed toward the work.

7. In electric welding, the combination with feed-rollers for automatically feeding the welding electrode toward the work, of a movable support resting upon the work and carrying said feed rollers and electrode, and means for guiding said support along the work.

8. An automatic arc welding device comprising a welding circuit, a fusible welding electrode and the work connected thereto, a carriage supported upon the work for traversing over the work an electric arc maintained between said electrode and work, an independent rotatable motor for feeding said electrode relatively toward the work, and a regulating circuit for said motor operative to vary the speed thereof to maintain the potential of a welding arc substantially constant.

9. The process of arc welding which consists in supporting the welding pencil upon the work, striking an arc between the work and the welding pencil, maintaining said arc substantially constant by feeding said pencil toward the work under control of a variable characteristic of the arc, and rolling the pencil support in a groove along said work to effect the weld.

10. The process of arc welding which consists in striking an arc between the work, constituting one electrode, and a welding pencil constituting the other electrode, applying current to the pencil at a point near to and at a fixed distance from the arc by a wiping contact, so feeding said pencil automatically toward the work as to maintain the arc length substantially constant, and moving the pencil along a groove in the work in order to effect a weld.

11. The improvement in that method of arc welding which consists in guiding a welding tool in a groove in work material, tilting the tool to bring the welding strip into contact with the work, then tilting the tool in an opposite direction to establish the arc, and moving the tool along said work.

12. A portable welding tool, including rotatable means for so automatically feeding a welding pencil as to maintain the arc length substantially constant, said means being provided with a supporting roller movable in and along a groove in the work material.

13. A portable welding tool, including means for automatically and continuously feeding a welding pencil to maintain the arc length substantially constant, and a supporting roller for said means movable in and along a groove in work material.

14. A portable welding device including a rotatable motor for feeding a welding pencil, said device being provided with wheeled supporting means bearing directly upon work material welded and to be operatively movable in a groove in said work material.

15. A portable welding device, including a rotatable motor for automatically feeding a welding strip, and means bearing directly upon the work material and operatively movable thereover, said means including a wheel operatively entering the seam to be welded and guiding device along the work.

16. An arc welding tool operatively supported in and movable along a groove in work material, and including a rotatable motor, a welding pencil, and means for feeding said welding pencil by said motor to an arc struck between said work material and pencil, and means for maintaining the arc.

17. An arc welding tool comprising means for guiding said tool along a groove in work material, rotatable means for automatically feeding a welding pencil, and means for maintaining the arc.

18. A portable arc welding tool comprising means for rolling said tool upon and along work material to be welded, guiding means entering a groove in said work material means for automatically feeding a welding pencil, and means for supplying current to the pencil through a wiping contact therewith.

19. A portable arc welding tool comprising means for rolling said tool along a groove in work material to be welded, means for automatically feeding a welding strip, means for maintaining the arc, and means for supplying current to the strip at a point near the arc.

20. A portable welding tool, including means for automatically feeding a welding strip, means governed by changes in a characteristic of an arc struck between the welding strip and work material for maintaining the arc by controlling the relation between the fusing rate and the feeding rate of the strip, means for supplying current to the strip at a point near the arc, and supporting means operatively rolling in a seam to be welded in work material.

21. A portable welding tool, including means for automatically feeding a welding strip, means governed by changes in a characteristic of the arc for maintaining the arc by controlling the relation between the fusing rate and the feeding rate of the strip, means for supplying current to the strip at a point near the arc, and supporting means bearing directly upon the work and operatively movable in a seam therein.

22. In a portable arc welding tool, means for automatically feeding a welding pencil, means governed by changes in a characteristic of the arc for maintaining the arc by correctively varying the rate of feed of said welding pencil, means for supplying current to the pencil at a point near the arc, and supporting means operatively bearing directly upon the work and rotatably movable in a seam therein.

23. In a portable arc welding tool, a carriage bearing directly upon the work and operatively movable in a seam therein, means mounted on said carriage for supporting a welding pencil, means for feeding the welding pencil toward the work, and means for adjusting the welding pencil supporting means with reference to the work.

24. In a portable arc welding tool, means bearing upon and entering the work material and operatively movable thereover for supporting a welding strip, automatic means for feeding the welding strip toward the work, means for striking an arc, means for maintaining said arc, and means for adjusting the welding strip supporting means with reference to the work.

25. In a portable arc welding tool, means bearing upon and entering a seam in work material and operatively movable thereon for supporting a welding strip, means for feeding the welding strip toward the work, means for conveying current to said strip at a point near the arc, and means for adjusting the welding strip supporting means with reference to the work.

26. In a portable arc welding tool, means operatively rolling in a seam of work material, means supported by said first-named means for continuously feeding a welding pencil toward the work material, means for conveying current to said pencil at a point near the arc, means for striking an arc, means for maintaining said arc, and means for adjusting the feeding means with reference to the work.

27. In a portable arc welding tool, means bearing upon work material and operatively movable in a seam therein for supporting a welding strip, means for automatically feeding the welding strip toward the work material, means for striking an arc, means governed by changes in a characteristic of the arc for maintaining the same, and means for adjusting the welding strip supporting means with reference to the work.

28. A welding tool for arc welding, provided with a handle for manually moving the same along the work, means for continuously feeding a welding strip toward the work, supporting means for the feeding means operatively rolling along the work, and guiding means for the tool entering the joint to be welded.

29. In arc welding apparatus, a welding tool bearing upon and entering a joint in work material and operatively rolling thereover and having a supporting electrode holder close to the arc, and means for feeding the electrode toward the work.

30. In arc welding apparatus, a welding tool bearing directly upon the work and operatively movable thereon and having a supporting electrode holder close to the arc, and arc-guiding means operatively entering the joint to be welded.

31. In a portable arc welding tool, supporting means bearing directly upon the work and operatively movable thereover, means entering a joint in the work for guiding the tool upon the work, means for supporting a welding pencil, rotary means for feeding the welding pencil, and means for adjusting the welding pencil supporting means with reference to the work.

32. In a portable arc welding tool manually movable over work material, supporting means operatively bearing in a joint in said work material, means for feeding a welding pencil toward the work, and means for controlling the relation between the fusing rate and the feeding rate of the pencil.

33. In a portable arc welding tool, supporting means operatively rolling in a seam of work material, means for manually moving the tool with reference to the work, means for continuously feeding a welding strip toward the work, and automatically acting means for correctively changing the rate of feed in order to maintain substantially constant the length of an arc struck between the work and the welding strip.

34. In an arc welding apparatus, means for feeding a welding strip toward the work and a motor connected to actuate said feeding means and having its field winding in series with the arc and its armature in shunt to the arc.

35. An arc welding tool comprising means operatively rolling in a seam in work material, and including means for automatically feeding a welding strip toward the work, and means for maintaining the arc.

36. In an arc welding apparatus, means for feeding a welding pencil toward the work, a rotatable motor having its armature in shunt to the arc and actuating said feeding means, and a support for said feeding means including a rotatable member bearing upon the work and operatively movable thereover.

37. In a welding apparatus, the combination of rotary means for feeding an electrode to the work, a motor for said feeding means, means associating said motor with the welding circuit to render it responsive in speed to variations in arc length, and supporting means for said welding apparatus including rollers movable in the work.

38. In electric welding, means for continuously and automatically feeding the welding electrode toward the work, and a movable support upon which said means and the electrode are mounted, said support bearing in a joint in the work and being movable toward and from the work for forming the arc.

39. In an arc welding apparatus, the combination of a welding head, means on said head for operatively rolling the same upon and along work to be welded, means for continuously feeding a welding pencil from said head toward the work automatically at a rate depending upon the length of the arc, and arc-guiding means entering the seam to be welded.

40. An arc welding apparatus comprising a supporting structure operatively contacting with a groove in work material, a welding head mounted on said supporting structure and means arranged to adjust the position of the welding head toward and from the work material.

41. In an apparatus for arc welding stationary work material, means for feeding a welding pencil to the arc, wiping-contact means for conveying current to said pencil, and arc-guiding means entering a groove in the work material.

42. In an apparatus for arc welding stationary work material, means for feeding a welding pencil to the arc, means for maintaining the arc, means wiped by the welding pencil for conveying current thereto, and arc-guiding means entering the joint to be welded.

43. In an apparatus for arc welding stationary work material, means for feeding a welding pencil to the arc, means stationary with reference to said pencil and at a fixed distance from the arc for conveying current to said pencil, and arc-guiding means entering a groove to be welded.

44. In an apparatus for arc welding stationary work material, means for feeding a welding pencil to the arc, means for maintaining the arc, means stationary with reference to said welding pencil for conveying current thereto near the arc, and arc guiding means entering a groove to be welded.

45. In an apparatus for arc welding stationary work material, means for feeding a welding pencil to the arc, a sleeve for guiding the pencil and conveying current thereto, and means for guiding the arc along a groove to be welded.

46. In an apparatus for arc welding stationary work material, means for feeding a welding pencil to the arc, a conductor substantially encircling said pencil and stationary with reference thereto for conveying current to said pencil, and arc guiding means entering the groove to be welded.

In testimony whereof, I have hereunto signed my name.

HARRY D. MORTON.